United States Patent
Dong (10) Patent No.: US 12,095,561 B2
(45) Date of Patent: Sep. 17, 2024

(54) COMMUNICATION METHOD AND APPARATUS FOR WIRELESS LOCAL AREA NETWORK, TERMINAL AND READABLE STORAGE MEDIUM

(71) Applicant: BEIJING XIAOMI MOBILE SOFTWARE CO., LTD., Beijing (CN)

(72) Inventor: Xiandong Dong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 469 days.

(21) Appl. No.: 17/594,405

(22) PCT Filed: Apr. 15, 2019

(86) PCT No.: PCT/CN2019/082664
§ 371 (c)(1),
(2) Date: Oct. 14, 2021

(87) PCT Pub. No.: WO2020/210940
PCT Pub. Date: Oct. 22, 2020

(65) Prior Publication Data
US 2022/0182183 A1    Jun. 9, 2022

(51) Int. Cl.
*H04L 1/08* (2006.01)
*H04L 1/00* (2006.01)
*H04L 5/00* (2006.01)
*H04W 84/12* (2009.01)

(52) U.S. Cl.
CPC .............. *H04L 1/08* (2013.01); *H04L 1/0003* (2013.01); *H04L 5/0053* (2013.01); *H04W 84/12* (2013.01)

(58) Field of Classification Search
CPC ....... H04L 1/0003; H04L 1/08; H04L 5/0053; H04W 84/12
See application file for complete search history.

(56) References Cited

U.S. PATENT DOCUMENTS

| 8,650,448 B2 | 2/2014 | Li |
| 8,848,569 B2 | 9/2014 | Wang |
| 8,891,677 B2 | 11/2014 | Yue |

(Continued)

FOREIGN PATENT DOCUMENTS

| CN | 101662346 A | 3/2010 |
| CN | 102045138 A | 5/2011 |

(Continued)

OTHER PUBLICATIONS

International Search Report in the international application No. PCT/CN2019/082664, mailed on Jan. 13, 2020.

(Continued)

*Primary Examiner* — Kent Krueger
(74) *Attorney, Agent, or Firm* — Syncoda LLC; Feng Ma (57) ABSTRACT

A communication method includes: receiving a data frame sent by a first wireless device; generating an acknowledgement message frame, the acknowledgement message frame comprising an acknowledgement flag and a retransmission flag, the acknowledgement flag being used for marking whether the data frame is received correctly, and the retransmission flag being used for marking the MCS or transmission power used during the retransmission of the data frame; and sending the acknowledgement message frame to the first wireless device.

16 Claims, 4 Drawing Sheets

---

S201, second wireless equipment receives a data frame sent by first wireless equipment

↓

S202, the second wireless equipment generates an acknowledgement message frame including an acknowledgement flag and a retransmission flag. The acknowledgement flag identifies whether the data frame is correctly received. The retransmission flag identifies at least one of an MCS or transmission power used for retransmitting the data frame

↓

S203, the second wireless equipment sends the acknowledgement message frame to the first wireless equipment (56) References Cited

U.S. PATENT DOCUMENTS

| | | | |
|---|---|---|---|
| 9,432,298 B1* | 8/2016 | Smith | H04L 49/9057 |
| 2010/0309874 A1* | 12/2010 | Sahara | H04L 1/1607 |
| | | | 370/329 |
| 2011/0087944 A1 | 4/2011 | Li | |
| 2012/0114030 A1 | 5/2012 | Yue | |
| 2012/0300665 A1 | 11/2012 | Wang | |
| 2012/0307775 A1* | 12/2012 | Chung | H04L 1/1671 |
| | | | 370/329 |
| 2013/0301569 A1* | 11/2013 | Wang | H04L 1/1864 |
| | | | 370/329 |
| 2017/0126363 A1 | 5/2017 | Wang et al. | |
| 2018/0167932 A1* | 6/2018 | Papasakellariou | H04L 1/1671 |
| 2018/0220357 A1* | 8/2018 | Kim | H04L 5/0048 |
| 2019/0109674 A1* | 4/2019 | Hedayat | H04L 5/0007 |
| 2022/0225357 A1* | 7/2022 | Yan | H04W 68/005 |

FOREIGN PATENT DOCUMENTS

| | | |
|---|---|---|
| CN | 102208967 A | 10/2011 |
| CN | 106464434 A | 2/2017 |
| CN | 108631935 A | 10/2018 |

OTHER PUBLICATIONS

Written Opinion of the International Search Authority in the international application No. PCT/CN2019/082664, mailed on Jan. 13, 2020.

* cited by examiner

FIG. 1

S201, second wireless equipment receives a data frame sent by first wireless equipment S202, the second wireless equipment generates an acknowledgement message frame including an acknowledgement flag and a retransmission flag. The acknowledgement flag identifies whether the data frame is correctly received. The retransmission flag identifies at least one of an MCS or transmission power used for retransmitting the data frame S203, the second wireless equipment sends the acknowledgement message frame to the first wireless equipment

COMMUNICATION METHOD AND APPARATUS FOR WIRELESS LOCAL AREA NETWORK, TERMINAL AND READABLE STORAGE MEDIUM

CROSS-REFERENCE TO RELATED APPLICATION

This application is a U.S. national stage of International Application No. PCT/CN2019/082664 filed on Apr. 15, 2019, the disclosure of which is hereby incorporated by reference in its entirety.

TECHNICAL FIELD

The present disclosure relates to the field of communication, and more particularly, to a Wireless Local Area Network (WLAN) communication method and device, and readable storage medium.

BACKGROUND

In a Wireless Fidelity (Wi-Fi) network, an acknowledgement feedback (ACK) or block acknowledgement feedback (Block ACK) mechanism is used regarding whether a data frame is correctly received. That is, a bit is configured to identify whether the data frame is correctly received. If the data frame is not correctly received, in conventional Wi-Fi art, the data frame is retransmitted (repeated) using an Automatic Repeat Request (ARQ) mechanism or a Hybrid Automatic Repeat Request (HARD) mechanism. That is, the data frame is retransmitted in a next Transmission OPportunity (TXOP) using the same Modulation and Coding Scheme (MCS) and the same transmission power as in the transmission, or the data are retransmitted using an instant adaptive scheme, i.e., a reduced MCS scheme.

In the Wi-Fi network, there are two causes why a data frame is not correctly received: 1, a poor communication environment causing interference to the receiving process; and 2, existence of a hidden node colliding with the communication of the present node, such that the data frame cannot be correctly received.

In case the data frame is not correctly received due to the first cause, if the data frame is retransmitted using the same MCS and transmission power as in the transmission, there may still be a high probability that retransmission of the data frame will fail. In case the data frame is not correctly received due to the second cause, if the data are retransmitted using the adaptive scheme, i.e., the reduced MCS scheme, spectrum utilization will be low, directly reducing the throughput of the entire system.

SUMMARY

The present disclosure provides a WLAN communication method, device, and system, and readable storage medium, allowing a data frame to be retransmitted using a proper MCS scheme in case of communication collision caused by a poor communication environment or presence of a hidden node, such that the retransmitted data can be correctly received. The technical solution is as follows.

According to an aspect of the present disclosure, there is provided a Wireless Local Area Network (WLAN) communication method. The method includes:
receiving a data frame sent by first wireless equipment;
generating an acknowledgement message frame, the acknowledgement message frame including an acknowledgement flag and a retransmission flag, the acknowledgement flag being configured to identify whether the data frame is correctly received, the retransmission flag being configured to identify at least one of a Modulation and Coding Scheme (MCS) or transmission power used for retransmitting the data frame; and
sending the acknowledgement message frame to the first wireless equipment.

In an optional embodiment, when the retransmission flag is a first value, it is indicated that the data frame is to be retransmitted using an MCS and transmission power same as in transmission, and when the retransmission flag is a second value, it is indicated that the data frame is to be retransmitted using at least one of an MCS or transmission power different from as used in transmission.

In an optional embodiment, when the retransmission flag is the second value, it is indicated that a second MCS used in retransmitting the data frame is lower in level than a first MCS used in transmitting the data frame.

In an optional embodiment, generating the acknowledgement message frame includes:
when the data frame is of a trigger-based type not correctly received, generating the acknowledgement message frame, the retransmission flag in the acknowledgement message frame being the second value; or
when the data frame is of a non-trigger-based type, a physical header of the data frame being correctly received, and a non-physical header of the data frame not being correctly received, generating the acknowledgement message frame, the retransmission flag in the acknowledgement message frame being the second value.

In an optional embodiment, generating the acknowledgement message frame includes:
when the data frame is of a non-trigger-based type and a physical header of the data frame not being correctly received, generating the acknowledgement message frame. The retransmission flag in the acknowledgement message frame may be the first value.

In an optional embodiment, when the acknowledgement flag identifies that the data frame is correctly received, the retransmission flag is null or of a default value.

In an optional embodiment, the data frame is a non-aggregated data frame of a single user, and the retransmission flag is of 1 bit; or the data frame is an aggregated data frame of a single user, and the retransmission flag is of a number of bits same as a number of continuously transmitted data frames in the aggregated data frame; or the data frame is an aggregated data frame of multiple users, and the retransmission flag is of a number of bits equal to a product of a number of users and a number of continuously transmitted data frames in the aggregated data frame.

In an optional embodiment, the retransmission flag is within a physical header of the acknowledgement message frame.

In an optional embodiment, the acknowledgement message frame further includes an MCS indicator field configured to indicate an MCS level used in retransmitting the data frame.

According to another aspect of the present disclosure, there is provided a Wireless Local Area Network (WLAN) communication method. The method includes:
sending a data frame to second wireless equipment;
receiving an acknowledgement message frame sent by the second wireless equipment, the acknowledgement message frame including an acknowledgement flag and a retransmission flag, the acknowledgement flag being configured to identify whether the data frame is correctly received, the retransmission flag being configured to identify at least one of a Modulation and Coding Scheme (MCS) or transmission power used for retransmitting the data frame; and retransmitting the data frame to the second wireless equipment according to the acknowledgement message frame.

In an optional embodiment, when the retransmission flag is a first value, it is indicated that the data frame is to be retransmitted using an MCS and transmission power same as in transmission.

When the retransmission flag is a second value, it is indicated that the data frame is to be retransmitted using at least one of an MCS or transmission power different from as used in transmission.

In an optional embodiment, when the retransmission flag is the second value, it is indicated that a second MCS used in retransmitting the data frame is lower in level than a first MCS used in transmitting the data frame, In an optional embodiment, retransmitting the data frame to the second wireless equipment according to the acknowledgement message frame includes:

determining the second MCS lower in level than the first MCS; and retransmitting the data frame to the second wireless equipment using the second MCS.

In an optional embodiment, the retransmission flag is within a physical header of the acknowledgement message frame.

In an optional embodiment, the acknowledgement message frame further includes MCS indication information configured to indicate an MCS level used in retransmitting the data frame.

Retransmitting the data frame to the second wireless equipment according to the acknowledgement message frame may include:

determining a second MCS according to the MCS indication information; and retransmitting the data frame to the second wireless equipment using the second MCS.

According to another aspect of the present disclosure, there is provided a Wireless Local Area Network (WLAN) communication device, including a receiving module, a generating module, and a sending module.

The receiving module is configured to receive a data frame sent by first wireless equipment.

The generating module is configured to generate an acknowledgement message frame. The acknowledgement message frame includes an acknowledgement flag and a retransmission flag. The acknowledgement flag is configured to identify whether the data frame is correctly received. The retransmission flag is configured to identify at least one of a Modulation and Coding Scheme (MCS) or transmission power used for retransmitting the data frame.

The sending module is configured to send the acknowledgement message frame to the first wireless equipment.

In an optional embodiment, when the retransmission flag is a first value, it is indicated that the data frame is to be retransmitted using an MCS and transmission power same as in transmission, and when the retransmission flag is a second value, it is indicated that the data frame is to be retransmitted using at least one of an MCS or transmission power different from as used in transmission.

In an optional embodiment, when the retransmission flag is the second value, it is indicated that a second MCS used in retransmitting the data frame is lower in level than a first MCS used in transmitting the data frame.

In an optional embodiment, the generating module is configured to, when the data frame is of a trigger-based type not correctly received, generate the acknowledgement message frame. The retransmission flag in the acknowledgement message frame may be the second value; or the generating module is configured to, when the data frame is of a non-trigger-based type, a physical header of the data frame being correctly received, and a non-physical header of the data frame not being correctly received, generate the acknowledgement message frame. The retransmission flag in the acknowledgement message frame may be the second value.

In an optional embodiment, the generating module is configured to, when the data frame is of a non-trigger-based type and a physical header of the data frame not being correctly received, generate the acknowledgement message frame. The retransmission flag in the acknowledgement message frame may be the first value.

In an optional embodiment, when the acknowledgement flag identifies that the data frame is correctly received, the retransmission flag is null or of a default value.

In an optional embodiment, the data frame is a non-aggregated data frame of a single user, and the retransmission flag is of 1 bit; or the data frame is an aggregated data frame of a single user, and the retransmission flag is of a number of bits same as a number of continuously transmitted data frames in the aggregated data frame; or the data frame is an aggregated data frame of multiple users, and the retransmission flag is of a number of bits equal to a product of a number of users and a number of continuously transmitted data frames in the aggregated data frame.

In an optional embodiment, the retransmission flag is within a physical header of the acknowledgement message frame.

In an optional embodiment, the acknowledgement message frame further includes an MCS indicator field configured to indicate an MCS level used in retransmitting the data frame.

According to another aspect of the present disclosure, there is provided a Wireless Local Area Network (WLAN) communication device, including a sending module and a receiving module.

The sending module is configured to send a data frame to second wireless equipment.

The receiving module is configured to receive an acknowledgement message frame sent by the second wireless equipment. The acknowledgement message frame includes an acknowledgement flag and a retransmission flag. The acknowledgement flag is configured to identify whether the data frame is correctly received. The retransmission flag is configured to identify at least one of a Modulation and Coding Scheme (MCS) or transmission power used for retransmitting the data frame.

The sending module is configured to retransmit the data frame to the second wireless equipment according to the acknowledgement message frame.

In an optional embodiment, when the retransmission flag is a first value, it is indicated that the data frame is to be retransmitted using an MCS and transmission power same as in transmission, and when the retransmission flag is a second value, it is indicated that the data frame is to be retransmitted using at least one of an MCS or transmission power different from as used in transmission.

In an optional embodiment, when the retransmission flag is the second value, it is indicated that a second MCS used in retransmitting the data frame is lower in level than a first MCS used in transmitting the data frame.

The WLAN communication device may further include a determining module.

The determining module may be configured to determine the second MCS lower in level than the first MCS.

The sending module may be configured to retransmit the data frame to the second wireless equipment using the second MCS.

In an optional embodiment, the retransmission flag is within a physical header of the acknowledgement message frame.

In an optional embodiment, the acknowledgement message frame further includes MCS indication information configured to indicate an MCS level used in retransmitting the data frame.

The determining module may be configured to determine a second MCS according to the MCS indication information.

The sending module may be configured to retransmit the data frame to the second wireless equipment using the second MCS.

According to another aspect of the present disclosure, there is provided a wireless communication equipment, including:
a processor;
a transceiver connected to the processor; and
a memory configured to store executable instructions executable by the processor.

The processor is configured to implement the WLAN communication method of an aforementioned aspect as well as of any optional implementation by loading and executing the executable instructions.

According to another aspect of the present disclosure, there is provided a wireless communication equipment, including:
a processor;
a transceiver connected to the processor; and
a memory configured to store executable instructions executable by the processor.

The processor is configured to implement the WLAN communication method of an aforementioned aspect as well as of any optional implementation by loading and executing the executable instructions.

According to another aspect of the present disclosure, there is provided a computer-readable storage medium having stored therein at least an instruction, at least a program, a code set or an instruction set, which, when loaded and executed by a processor, implements the WLAN communication method of an aforementioned aspect as well as of any optional implementation by loading and executing the executable instructions.

A technical solution provided by embodiments of the present disclosure may include beneficial effects at least as follows.

Second wireless equipment sends an acknowledgement message frame to first wireless equipment. The acknowledgement message frame includes an acknowledgement flag and a retransmission flag. The retransmission flag is configured to identify an MCS and/or transmission power used for retransmitting the data frame, so that the data frame may be retransmitted using a reasonable MCS and/or reasonable transmission power. That is, in case of poor communication quality, a different MCS and different transmission power may be used, such that in case of a poor communication environment, a high probability that retransmission of the data frame will fail even if the data frame is retransmitted using the same MCS and transmission power as in the transmission, is avoided. Or, in case that existence of a hidden node causes a communication collision, the data may be retransmitted using the same MCS as in transmitting the data frame, improving spectrum utilization, thereby improving system throughput.

BRIEF DESCRIPTION OF THE DRAWINGS

Drawings for describing embodiments of the present disclosure or related art are introduced below briefly for clearer illustration of a technical solution of embodiments of the present disclosure. Note that the drawings described below refer merely to some embodiments of the present disclosure. A person having ordinary skill in the art may acquire other drawings according to the drawings herein without creative effort.

DETAILED DESCRIPTION

To clearly show a technical problem to be solved, a technical solution, and beneficial effects of the present disclosure, implementation of the present disclosure is further elaborated below with reference to the drawings.

A communication system and a service scene are illustrated by embodiments of the present disclosure to illustrate a technical solution of embodiments of the present disclosure more clearly, and do not form a limitation to a technical solution of embodiments of the present disclosure. A person having ordinary skill in the art may know that with evolution of the communication system and emergence of a new service scene, a technical solution provided by embodiments of the present disclosure may also apply to a similar technical problem.

Figure 1:
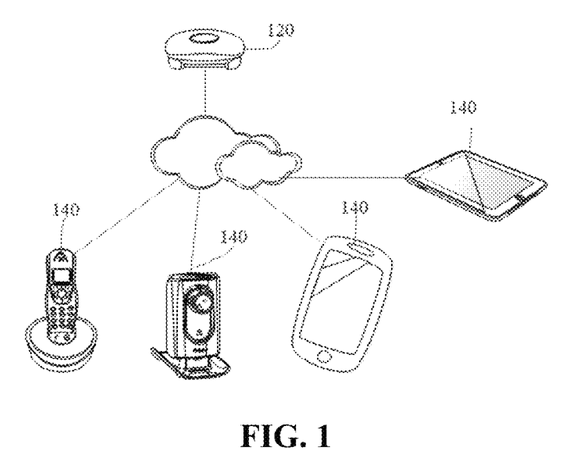
FIG. 1 is a diagram of a communication system according to an illustrative embodiment of the present disclosure.

FIG. 1 shows a block diagram of a communication system according to an illustrative embodiment of the present disclosure. The communication system includes an Access Point (AP) 120 and a station (STA) 140.

The wireless AP 120 is configured to provide a wireless access function. The wireless AP 120 may be a wireless router, a base station having a Wi-Fi function, etc. One wireless AP 120 may be accessed by multiple stations 140.

A Station 140 is configured to access the wireless AP 120. The Station 140 may be equipment such as a mobile phone, a tablet, a notebook computer, an electronic book, an industrial machine, etc.

In the present disclosure, first wireless equipment may be a data sender of the wireless AP 120 and the station 140, and second wireless equipment may be a data receiver of the wireless AP 120 and the station 140.

The communication system may be the Institute of Electrical and Electronics Engineers (IEEE) 802.11a/b/g/n/ac/ax/be. Embodiments of the present disclosure are illustrated taking the communication system being IEEE802.11be as an example. Based on the technical problem described in the background, in IEEE802.11be, the present disclosure defines a new mechanism for retransmitting a data frame, capable of improving effective spectrum utilization and throughput of the entire system.

Figure 2:
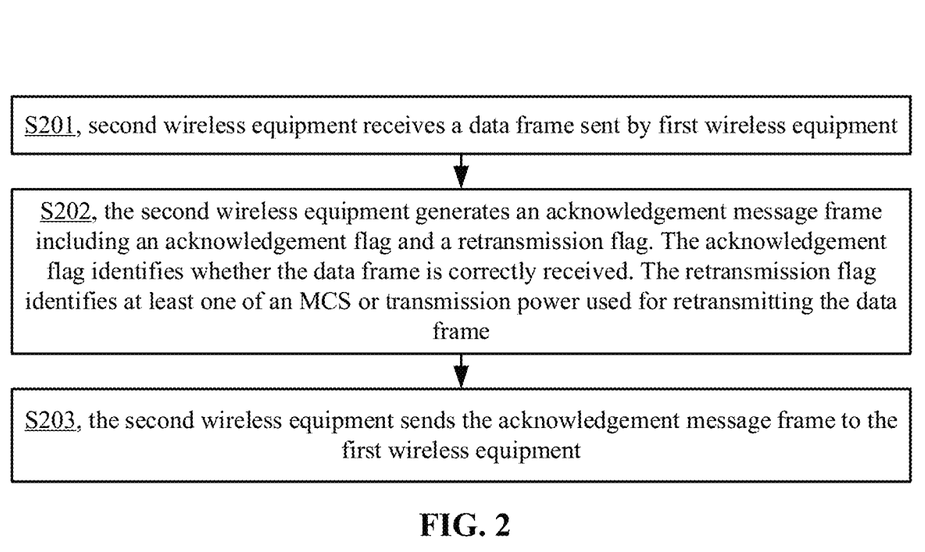
FIG. 2 is a flowchart of a WLAN communication method according to an illustrative embodiment of the present disclosure.

FIG. 2 is a block diagram of a WLAN communication method according to an illustrative embodiment of the present disclosure. The method may be applied to the second wireless equipment shown in FIG. 1. The method may include a step as follows.

At S201, second wireless equipment receives a data frame sent by first wireless equipment.

The data frame may be a unicast data frame or an aggregated data frame.

At S202, the second wireless equipment generates an acknowledgement message frame. The acknowledgement message frame includes an acknowledgement flag and a retransmission flag. The acknowledgement flag is configured to identify whether the data frame is correctly received. The retransmission flag is configured to identify at least one of a Modulation and Coding Scheme (MCS) or transmission power used for retransmitting the data frame.

The second wireless equipment may generate an acknowledgement message frame according to how the data frame is received.

When receiving the data frame successfully, the second wireless equipment may generate a first acknowledging flag configured to identify that the data frame is correctly received, in which case the retransmission flag may be null or of a default value. Alternatively, the first flag may be set to "1", indicating that the data frame is correctly received and no retransmission is needed. In other embodiments, the first flag may also be set to another binary value.

When failing to receive the data frame, the second wireless equipment may generate a second acknowledging flag configured to identify that the data frame is not correctly received. In this case, the retransmission flag may be configured to indicate the MSC and/or the transmission power used in retransmitting the data frame. Optionally, the second flag may be set to "0", indicating that the data frame is not correctly received and has to be retransmitted. In other embodiments, the second flag may also be set to another binary value.

At S203, the second wireless equipment sends the acknowledgement message frame to the first wireless equipment.

To sum up, with the method provided in the embodiment, second wireless equipment sends an acknowledgement message frame to first wireless equipment. The acknowledgement message frame includes an acknowledgement flag and a retransmission flag. The retransmission flag is configured to identify an MCS and/or transmission power used for retransmitting the data frame, so that the data frame may be retransmitted using a reasonable MCS and/or reasonable transmission power. That is, in case of poor communication quality, a different MCS and different transmission power may be used, such that in case of a poor communication environment, a high probability that retransmission of the data frame will fail even if the data frame is retransmitted using the same MCS and transmission power as in the transmission, is avoided, or in case that existence of a hidden node causes a communication collision, the data may be retransmitted using the same MCS as in transmitting the data frame, improving spectrum utilization, thereby improving system throughput.

In an optional implementation, if the data are not correctly received due to a poor communication environment, the data are retransmitted using an MCS with a progressively lowered level. For example, if the data frame is initially transmitted using MCS9, then in the next retransmission, the data frame may be retransmitted using MCS8.

Figure 3:
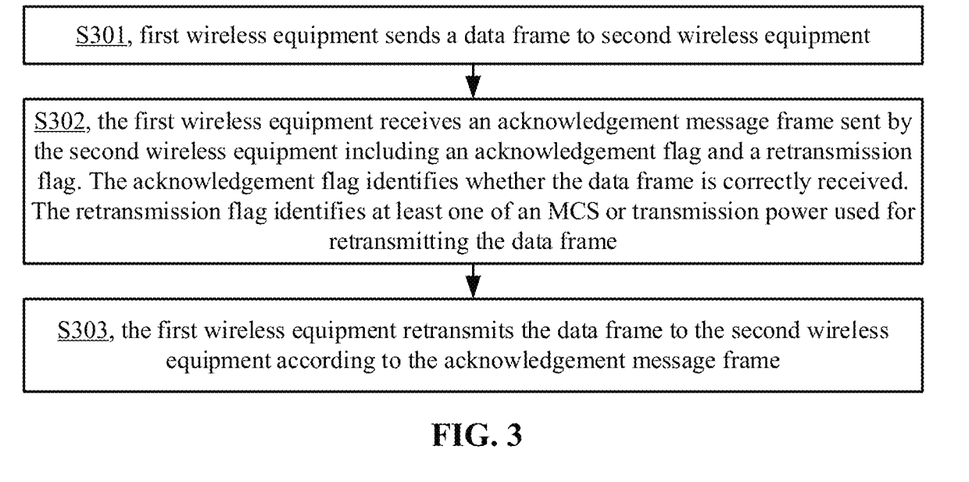
FIG. 3 is a flowchart of a WLAN communication method according to an illustrative embodiment of the present disclosure.

FIG. 3 is a block diagram of a WLAN communication method according to an illustrative embodiment of the present disclosure. The method may be applied to the first wireless equipment shown in FIG. 1. The method may include a step as follows.

At S301, first wireless equipment sends a data frame to second wireless equipment.

The data frame may be a unicast data frame or an aggregated data frame.

At S302, the first wireless equipment receives an acknowledgement message frame sent by the second wireless equipment. The acknowledgement message frame includes an acknowledgement flag and a retransmission flag. The acknowledgement flag is configured to identify whether the data frame is correctly received. The retransmission flag is configured to identify at least one of a Modulation and Coding Scheme (MCS) or transmission power used for retransmitting the data frame.

At S303, the first wireless equipment retransmits the data frame to the second wireless equipment according to the acknowledgement message frame.

When the acknowledgement flag identifies that the data frame is not correctly received, the first wireless equipment retransmits the data frame to the second wireless equipment according to the MCS and/or transmission power indicated by the retransmission flag.

To sum up, with the method provided in the embodiment, the first wireless equipment receives an acknowledgement message frame sent by the second wireless equipment. The acknowledgement message frame includes an acknowledgement flag and a retransmission flag. The retransmission flag is configured to identify an MCS and/or transmission power used for retransmitting the data frame, so that the data frame may be retransmitted using a reasonable MCS and/or reasonable transmission power. That is, in case of poor communication quality, a different MCS and different transmission power may be used, such that in case of a poor communication environment, a high probability that retransmission of the data frame will fail even if the data frame is retransmitted using the same MCS and transmission power as in the transmission, is avoided.

Figure 4:
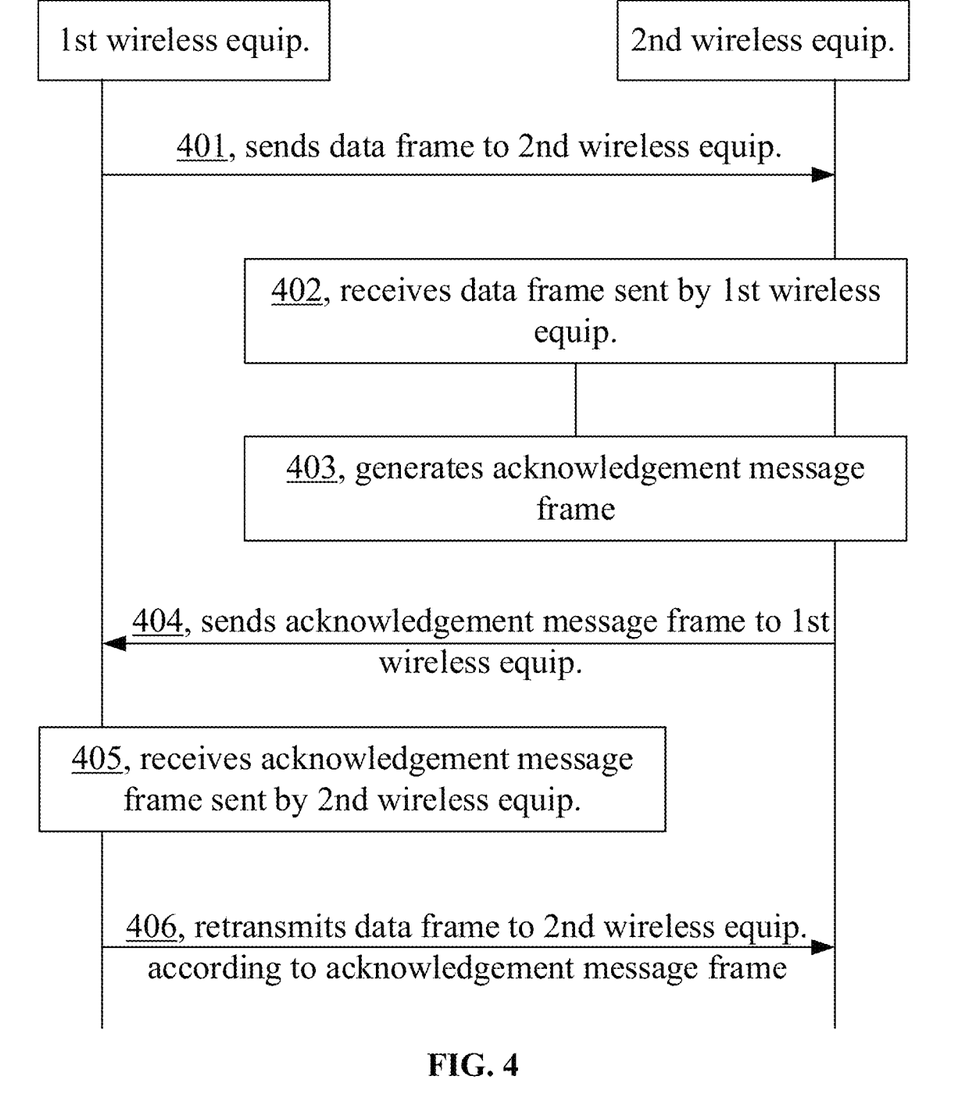
FIG. 4 is a flowchart of a WLAN communication method according to an illustrative embodiment of the present disclosure.

FIG. 4 is a block diagram of a WLAN communication method according to an illustrative embodiment of the present disclosure. The method may be applied to the communication system shown in FIG. 1. The method may include a step as follows.

At S401, first wireless equipment sends a data frame to second wireless equipment.

The data frame may be a unicast data frame or an aggregated data frame.

In a Transmission Opportunity (TXOP), the first wireless equipment acting as a data sender may send a data frame to the second wireless equipment acting as a data receiver.

At S402, the second wireless equipment receives the data frame sent by the first wireless equipment.

At S403, the second wireless equipment generates an acknowledgement message frame. The acknowledgement message frame includes an acknowledgement flag and a retransmission flag. The acknowledgement flag is configured to identify whether the data frame is correctly received. The retransmission flag is configured to identify at least one of a Modulation and Coding Scheme (MCS) or transmission power used for retransmitting the data frame.

Optionally, when the acknowledgement flag is "1", it identifies that the data frame is correctly received, and when the acknowledgement flag is "0", it identifies that the data frame is not correctly received. Of course, in different embodiments, "0" may be used to identify correct reception, and "1" may be used to identify incorrect reception, as well.

Optionally, when the reception failure of the data frame is caused by a transmission collision of a hidden node, the retransmission flag may be set to the first value, and when the reception failure of the data frame is caused by a poor communication environment, the retransmission flag may be set to the second value.

When the retransmission flag is the first value, it is indicated that the data frame is to be retransmitted using an MCS and transmission power same as in the transmission (or the previous transmission, or the last transmission). When the retransmission flag is the second value, it is indicated that the data frame is to be retransmitted using at least one of an MCS or transmission power different from as used in the transmission. Optionally, when the retransmission flag is the second value, it is indicated that a second MCS used in retransmitting the data frame is lower in level than a first MCS used in transmitting the data frame. For example, an MCS may be of levels 0-9. If the first MCS is of a level 8, then the second MCS may be of a level 7. If the first MCS is of a level 5, then the second MCS may be of a level 4.

The retransmission flag may be used together with whether the data frame is correctly received. Only when the data frame is not correctly received, will the retransmission flag be set with a valid value. Illustratively, when the acknowledgement flag is "1", i.e., when the data frame is correctly received, the retransmission flag is null or of a default value. When the acknowledgement flag is "0", the retransmission flag is of the first value or the second value.

Optionally, the retransmission flag is within a physical header of the acknowledgement message frame, such as in a Signal (SIG) domain or a new domain. Taking the new domain as an example, referring to FIG. 5, the acknowledgement message frame includes a Short Training Field (STF), a Long Training Field (LTF), a Long signal (L-SIG) field, a retransmission flag (Re-TX field), and a Medium Access Control Frame (MAC Frame).

Optionally, the data frame is a non-aggregated data frame of a single user, and the retransmission flag is of 1 bit; or the data frame is an aggregated data frame of a single user, and the retransmission flag is of a number of bits same as a number of continuously transmitted data frames in the aggregated data frame; or the data frame is an aggregated data frame of multiple users, and the retransmission flag is of a number of bits equal to a product of a number of users and a number of continuously transmitted data frames in the aggregated data frame.

By the aggregated data frame of a single user, it means that there is one piece of first wireless equipment, and the first wireless equipment sends an aggregated data frame to the second wireless equipment. By the aggregated data frame of multiple users, it means that there are multiple pieces of first wireless equipment, and each first wireless equipment sends an aggregated data frame to the second wireless equipment.

Figure 5:
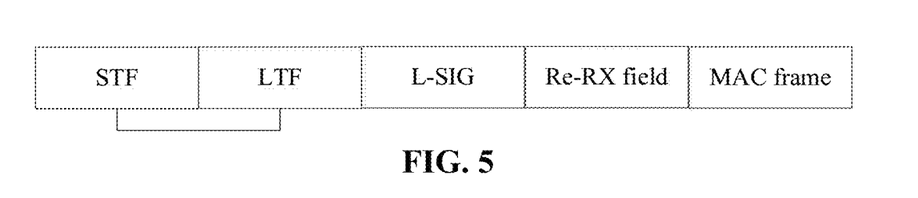
FIG. 5 is a diagram of a structure of an acknowledgement message frame according to an illustrative embodiment of the present disclosure.

In another optional embodiment, an MCS indicator field is added following the retransmission flag (Re-TX field). The MCS indicator field may be configured to indicate an MCS level used in retransmitting the data frame. For example, the MCS levels may be 0 to 9, and the MCS indication field may occupy three bits.

When the data frame is not correctly received, the second wireless equipment may set the retransmission flag according to the type of the data frame and how the data frame is received, which includes but is not limited to at least one of three cases as follows.

In the first case, when the data frame is of a trigger-based type not correctly received, the acknowledgement message frame may be generated. The retransmission flag in the acknowledgement message frame may be the second value.

When the data frame is of a trigger-based type, it indicates that the station is allocated a transmission resource for transmitting the data frame within the coverage of the AP. Then, during transmission of the data frame, since a resource allocation message frame is broadcast in the coverage of the AP, and any station/access point in the coverage of the AP may receive the resource allocation message frame, there is no communication collision caused by data sending by a hidden node. Therefore, when the data frame is not correctly received, it is highly possible that the incorrect reception is caused by a poor communication environment, in which case the retransmission flag may be set to the second value.

In the second case, when the data frame is of a non-trigger-based type, a physical header of the data frame is correctly received, and a non-physical header of the data frame is not correctly received, the acknowledgement message frame may be generated. The retransmission flag in the acknowledgement message frame may be the second value.

When the data frame is of a non-trigger-based type, it indicates that there may be a hidden node when the data frame is sent, and both causes are possible when the data frame is not correctly received. However, since the physical header of the data frame is transmitted using a basic MCS, and the load of the data frame is transmitted using a high MCS, if the second terminal equipment can resolve the physical header of the data frame but cannot resolve the non-physical header, then there is a great chance that the failure is caused by a poor communication environment, in which case the retransmission flag may be set as the second value.

In the third case, when the data frame is of a non-trigger-based type and a physical header of the data frame is not correctly received, the acknowledgement message frame may be generated. The retransmission flag in the acknowledgement message frame may be the first value.

By the data frame being of a trigger-based type, it means that before the data frame is sent, the sender of the data frame may send a resource allocation message frame. That in general is, a STA receives a time-frequency resource allocated to the STA by the AP for sending the data frame.

Based on the second case, since the physical header of the data frame is transmitted using the basic MCS, if the second terminal equipment cannot resolve the physical header of the data frame, there is a great chance that the failure is caused by a collision of a hidden node sending data, in which case the retransmission flag may be set as the first value.

At S404, the second wireless equipment sends the acknowledgement message frame to the first wireless equipment.

At S405, the first wireless equipment receives an acknowledgement message frame sent by the second wireless equipment. The acknowledgement message frame includes an acknowledgement flag and a retransmission flag. The acknowledgement flag is configured to identify whether the data frame is correctly received. The retransmission flag is configured to identify at least one of a Modulation and Coding Scheme (MCS) or transmission power used for retransmitting the data frame.

At S406, the first wireless equipment retransmits the data frame to the second wireless equipment according to the acknowledgement message frame.

When the acknowledgement flag identifies that the data frame is not correctly received, the first wireless equipment retransmits the data frame to the second wireless equipment according to the MCS and/or transmission power indicated by the retransmission flag.

When the retransmission flag is the first value, the data frame may be retransmitted using an MCS and/or transmission power same as in the transmission (or the previous transmission, or the last transmission).

When the retransmission flag is the second value, the data frame may be retransmitted using an MCS and/or transmission power different from as used in the transmission. Illustratively, the first wireless equipment may determine the level of the second MCS for the first MCS, and retransmit the data frame using an MSC parameter and transmission power corresponding to the second MCS level. The second MCS level may be lower than the first MCS used in the transmission of the data frame. For example, an MCS may be of levels 0-9. If the first MCS is of a level 8, then the second MCS may be of a level 7. If the first MCS is of a level 5, then the second MCS may be of a level 4. If the first MCS is of a level 5, then the second MCS may be of a level 3.

Optionally, if the acknowledgement message frame further includes MCS indication information configured to indicate an MCS level used in retransmitting the data frame, the first wireless equipment may determine a second MCS according to the MCS indication information, and retransmit the data frame to the second wireless equipment using the second MCS.

In an existing Wi-Fi protocol, for a certain frequency and a certain channel bandwidth, the MCS and the transmission power are in a one-to-one correspondence. Therefore, in the embodiment, the retransmission flag may indicate both the MCS and the transmission power, for example. However, in other embodiments, the retransmission flag may indicate just the MCS used in the retransmission, or may indicate just the transmission power used in the retransmission.

To sum up, with the method provided in the embodiment, the first wireless equipment receives an acknowledgement message frame sent by the second wireless equipment. The acknowledgement message frame includes an acknowledgement flag and a retransmission flag. The retransmission flag is configured to identify an MCS and/or transmission power used for retransmitting the data frame, so that the data frame may be retransmitted using a reasonable MCS and/or reasonable transmission power. That is, in case of poor communication quality, a different MCS and different transmission power may be used, such that in case of a poor communication environment, a high probability that retransmission of the data frame will fail even if the data frame is retransmitted using the same MCS and transmission power as in the transmission, is avoided, or in case that existence of a hidden node causes a communication collision, ineffective spectrum utilization in case that the data frame is retransmitted in a Link Adaptation (LA) mode, i.e., a mode in which the data frame not correctly received is retransmitted using lowered MCS, is avoided.

With the method provided in the embodiment, when a reception failure is caused by a collision of communication of a hidden node, the retransmission flag is set to the first value, indicating that the same MCS and transmission power are used in retransmitting the data frame, ensuring compatibility with related art.

With the method provided in the embodiment, when a reception failure is caused by a poor communication environment, the retransmission flag is set to the second value, indicating that a different MCS and/or transmission power, such as an MCS and transmission power of a lower level, are used in retransmitting the data frame, improving the rate of successful retransmission in case of a poor communication environment.

The following are device embodiments of the embodiments of the present disclosure. Refer to a one-to-one corresponding method embodiment for any detail not elaborated in a device embodiment.

Figure 6:
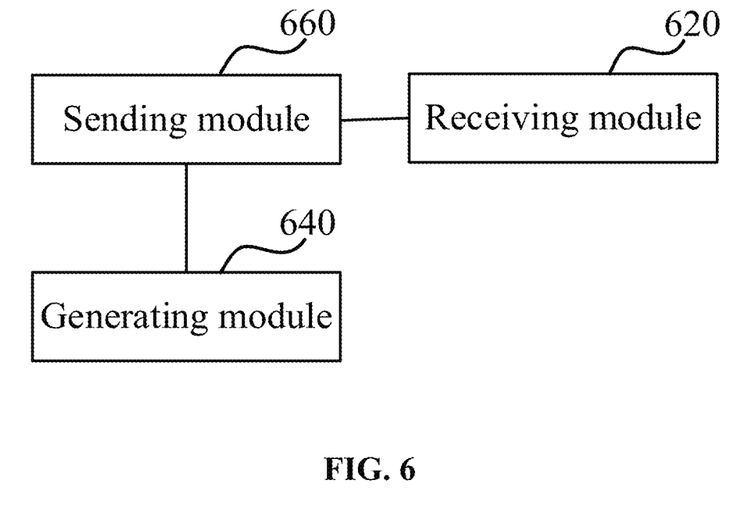
FIG. 6 is a block diagram of a WLAN communication device according to an illustrative embodiment of the present disclosure.

FIG. 6 is a block diagram of a WLAN communication device according to an illustrative embodiment of the present disclosure. The device may be implemented as all or a part of the second communication equipment through software, hardware, or a combination of software and hardware. The device includes a receiving module 620, a generating module 640, and a sending module 660. The receiving module 620 and the sending module 660 may be a hardware device such as a radio frequency antenna. The generating module 640 may be hardware equipment such as a central processing unit or a baseband processor.

The receiving module 620 is configured to receive a data frame sent by first wireless equipment.

The generating module 640 is configured to generate an acknowledgement message frame. The acknowledgement message frame includes an acknowledgement flag and a retransmission flag. The acknowledgement flag is configured to identify whether the data frame is correctly received. The retransmission flag is configured to identify at least one of a Modulation and Coding Scheme (MCS) or transmission power used for retransmitting the data frame.

The sending module 660 is configured to send the acknowledgement message frame to the first wireless equipment.

In an optional embodiment, when the retransmission flag is a first value, it is indicated that the data frame is to be retransmitted using an MCS and transmission power same as in transmission; and when the retransmission flag is a second value, it is indicated that the data frame is to be retransmitted using at least one of an MCS or transmission power different from as used in transmission.

In an optional embodiment, when the retransmission flag is the second value, it is indicated that a second MCS used in retransmitting the data frame is lower in level than a first MCS used in transmitting the data frame.

In an optional embodiment, the generating module 640 is configured to, in response to the data frame being of a trigger-based type not correctly received, generate the acknowledgement message frame, the retransmission flag in the acknowledgement message frame being the second value; or the generating module 640 is configured to, in response to the data frame being of a non-trigger-based type, a physical header of the data frame being correctly received, and a non-physical header of the data frame not being correctly received, generate the acknowledgement message frame, the retransmission flag in the acknowledgement message frame being the second value.

In an optional embodiment, the generating module 640 is configured to, in response to the data frame being of a non-trigger-based type and a physical header of the data frame not being correctly received, generate the acknowledgement message frame, the retransmission flag in the acknowledgement message frame being the first value.

In an optional embodiment, when the acknowledgement flag identifies that the data frame is correctly received, the retransmission flag is null or of a default value.

In an optional embodiment, the data frame is a non-aggregated data frame of a single user, and the retransmission flag is of 1 bit; or the data frame is an aggregated data frame of a single user, and the retransmission flag is of a number of bits same as a number of continuously transmitted data frames in the aggregated data frame; or the data frame is an aggregated data frame of multiple users, and the retransmission flag is of a number of bits equal to a product of a number of users and a number of continuously transmitted data frames in the aggregated data frame.

In an optional embodiment, the retransmission flag is within a physical header of the acknowledgement message frame.

In an optional embodiment, the acknowledgement message frame further includes an MCS indicator field configured to indicate an MCS level used in retransmitting the data frame.

Figure 7:
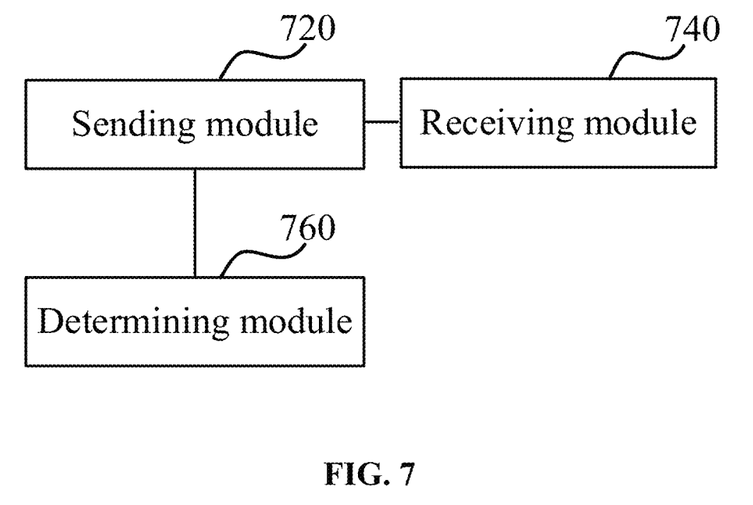
FIG. 7 is a block diagram of a WLAN communication device according to an illustrative embodiment of the present disclosure.

FIG. 7 is a block diagram of a WLAN communication device according to an illustrative embodiment of the present disclosure. The device may be implemented as all or a part of the first communication equipment through software, hardware, or a combination of software and hardware. The device may include a sending module 720, a receiving module 740, and a determining module 760. The receiving module 740 and the sending module 720 may be a hardware device such as a radio frequency antenna. The determining module 760 may be hardware equipment such as a central processing unit or a baseband processor.

The sending module 720 is configured to send a data frame to second wireless equipment.

The receiving module 740 is configured to receive an acknowledgement message frame sent by the second wireless equipment. The acknowledgement message frame includes an acknowledgement flag and a retransmission flag. The acknowledgement flag is configured to identify whether the data frame is correctly received. The retransmission flag is configured to identify at least one of a Modulation and Coding Scheme (MCS) or transmission power used for retransmitting the data frame.

The sending module 720 is configured to retransmit the data frame to the second wireless equipment according to the acknowledgement message frame.

In an optional embodiment, when the retransmission flag is a first value, it is indicated that the data frame is to be retransmitted using an MCS and transmission power same as in transmission.

When the retransmission flag is a second value, it is indicated that the data frame is to be retransmitted using at least one of an MCS or transmission power different from as used in transmission.

In an optional embodiment, when the retransmission flag is the second value, it is indicated that a second MCS used in retransmitting the data frame is lower in level than a first MCS used in transmitting the data frame.

The WLAN communication device may further include a determining module.

The determining module 760 may be configured to determine the second MCS lower in level than the first MCS.

The sending module 720 may be configured to retransmit the data frame to the second wireless equipment using the second MCS.

In an optional embodiment, retransmission flag is within a physical header of the acknowledgement message frame.

In an optional embodiment, the acknowledgement message frame further includes MCS indication information. The MCS indication information may be configured to indicate an MCS level used in retransmitting the data frame.

The WLAN communication device may further include a determining module 760.

The determining module 760 may be configured to determine a second MCS according to the MCS indication information.

The sending module 720 may be configured to retransmit the data frame to the second wireless equipment using the second MCS.

Figure 8:
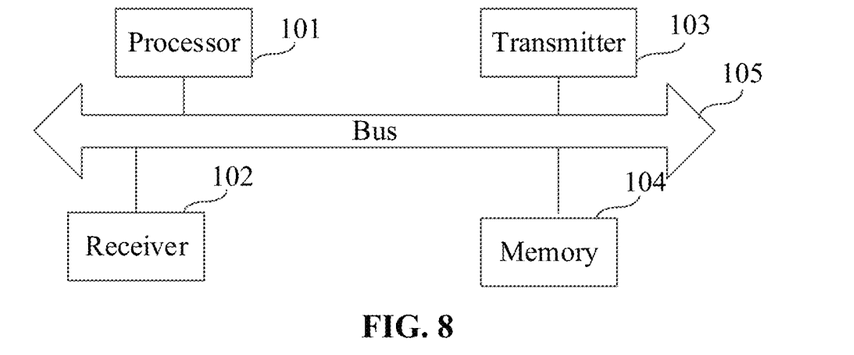
FIG. 8 is a block diagram of wireless communication equipment according to an illustrative embodiment of the present disclosure.

FIG. 8 is a diagram of a structure of wireless communication equipment according to an illustrative embodiment of the present disclosure. The terminal includes a processor 101, a receiver 102, a transmitter 103, a memory 104, and a bus 105.

The processor 101 may include one or more processing cores. The processor 101 may implement various functional applications and information processing by executing software programs and modules.

The receiver 102 and the transmitter 103 may be implemented as a communication component. The communication component may be a communication chip.

The memory 104 is connected to the processor 101 via the bus 105.

The memory 104 may be configured to store at least one instruction. The processor 101 may be configured to execute the at least one instruction to implement the steps in a method embodiment described here.

Further, the memory 104 may be implemented by any type of volatile or non-volatile storage equipment, or a combination of the any listed item. The volatile or non-volatile memory includes, but is not limited to, a magnetic disk or an optical disk, Electrically Erasable Programmable Read-Only Memory (EEPROM), Erasable Programmable Read-Only Memory (EPROM), Static Random-Access Memory (SRAM), Read Only Memory (ROM), magnetic memory, flash memory, programmable ROM (PROM), etc.

An illustrative embodiment of the present disclosure further provides a computer-readable storage medium having stored therein at least an instruction, at least a program, a code set or an instruction set, which, when loaded and executed by a processor, implements steps of the WLAN communication method provided by a method embodiment here.

A person having ordinary skill in the art may understand that all or part of the options of the embodiments may be implemented through a hardware or may be completed by instructing a related hardware through a program. The program may be stored in a transitory/non-transitory computer-readable storage medium. The computer-readable storage medium may be Read-Only Memory (ROM), a magnetic disk, a CD, etc.

What described are merely embodiments of the present disclosure, and are not intended to limit the present disclosure. Any modification, equivalent replacement, improvement, and/or the like made within the spirit and principle of the present disclosure should be included in the scope of the present disclosure.

What is claimed is:

1. A Wireless Local Area Network (WLAN) communication method, comprising:
   receiving a data frame sent by first wireless equipment;
   generating an acknowledgement message frame, the acknowledgement message frame comprising an acknowledgement flag and a retransmission flag, the acknowledgement flag being configured to identify whether the data frame is correctly received, the retransmission flag being configured to identify at least one of a Modulation and Coding Scheme (MCS) or transmission power used for retransmitting the data frame; and
   sending the acknowledgement message frame to the first wireless equipment,
   wherein in response to the retransmission flag being a first value, it is indicated that the data frame is to be retransmitted using an MCS and transmission power same as used in transmitting the data frame,
   wherein in response to the retransmission flag being a second value, it is indicated that the data frame is to be retransmitted using at least one of an MCS or transmission power different from as used in transmitting the data frame,
   wherein generating the acknowledgement message frame comprises at least one of:
   in response to the data frame being of a trigger-based type not correctly received, or in response to the data frame being of a non-trigger-based type, with a physical header of the data frame being correctly received, and a load of the data frame not being correctly received, generating the acknowledgement message frame, the retransmission flag in the acknowledgement message frame being the second value; or
   in response to the data frame being of the non-trigger-based type and the physical header of the data frame not being correctly received, generating the acknowledgement message frame, the retransmission flag in the acknowledgement message frame being the first value.

2. The WLAN communication method of claim 1, wherein the second value indicates that the data frame is to be retransmitted using an MCS with a progressively lowered level.

3. The WLAN communication method of claim 1, wherein in response to the retransmission flag being the second value, it is indicated that the MCS used in retransmitting the data frame is lower in level than the MCS used in transmitting the data frame.

4. The WLAN communication method of claim 1, wherein in response to the acknowledgement flag identifying that the data frame is correctly received, the retransmission flag is null or of a default value.

5. The WLAN communication method of claim 1, wherein the data frame is a non-aggregated data frame of a single user, and the retransmission flag is of 1 bit; or
   wherein the data frame is an aggregated data frame of a single user, and the retransmission flag is of a number of bits same as a number of continuously transmitted data frames in the aggregated data frame; or
   wherein the data frame is an aggregated data frame of multiple users, and the retransmission flag is of a number of bits equal to a product of a number of users and a number of continuously transmitted data frames in the aggregated data frame.

6. The WLAN communication method of claim 1, wherein the retransmission flag is within a physical header of the acknowledgement message frame.

7. The WLAN communication method of claim 1, wherein the acknowledgement message frame further comprises an MCS indicator field configured to indicate an MCS level used in retransmitting the data frame.

8. A Wireless Local Area Network (WLAN) communication method, comprising:
   sending a data frame to second wireless equipment;
   receiving an acknowledgement message frame sent by the second wireless equipment, the acknowledgement message frame comprising an acknowledgement flag and a retransmission flag, the acknowledgement flag being configured to identify whether the data frame is correctly received, the retransmission flag being configured to identify at least one of a Modulation and Coding Scheme (MCS) or transmission power used for retransmitting the data frame; and
   retransmitting the data frame to the second wireless equipment according to the acknowledgement message frame, by:
   in response to the retransmission flag being a first value, retransmitting the data frame using an MCS and transmission power same as used in transmitting the data frame; and
   in response to the retransmission flag being a second value, retransmitting the data frame using at least one of an MCS or transmission power different from as used in transmitting the data frame,
   wherein the second value of the retransmission flag indicates that the data frame is of a trigger-based type not correctly received, or that the data frame is of a non-trigger-based type with a physical header of the data frame being correctly received, and a load of the data frame not being correctly received,
   where the first value of the retransmission flag indicates that the data frame is of the non-trigger-based type with the physical header of the data frame not being correctly received.

9. The WLAN communication method of claim 8, wherein retransmitting the data frame to the second wireless equipment according to the acknowledgement message frame comprises: retransmitting the data frame using an MCS with a progressively lowered level in response to the retransmission flag being the second value.

10. The WLAN communication method of claim 8, wherein in response to the retransmission flag being the second value, it is indicated that a second MCS is lower in level than a first MCS, wherein the second MCS is the MCS used in retransmitting the data frame, and the first MCS is the MCS used in transmitting the data frame,
    wherein retransmitting the data frame to the second wireless equipment according to the acknowledgement message frame comprises:
    determining the second MCS lower in level than the first MCS; and
    retransmitting the data frame to the second wireless equipment using the second MCS.

11. The WLAN communication method of claim 8, wherein the retransmission flag is within a physical header of the acknowledgement message frame.

12. The WLAN communication method of claim 8, wherein the acknowledgement message frame further comprises MCS indication information configured to indicate an MCS level used in retransmitting the data frame, wherein retransmitting the data frame to the second wireless equipment according to the acknowledgement message frame comprises:

determining a second MCS according to the MCS indication information; and retransmitting the data frame to the second wireless equipment using the second MCS.

13. Wireless communication equipment, comprising:

a processor;

a transceiver connected to the processor; and a memory configured to store executable instructions executable by the processor, wherein the processor is configured to implement:

receiving a data frame sent by first wireless equipment;

generating an acknowledgement message frame, the acknowledgement message frame comprising an acknowledgement flag and a retransmission flag, the acknowledgement flag being configured to identify whether the data frame is correctly received, the retransmission flag being configured to identify at least one of a Modulation and Coding Scheme (MCS) or transmission power used for retransmitting the data frame; and sending the acknowledgement message frame to the first wireless equipment, wherein in response to the retransmission flag being a first value, it is indicated that the data frame is to be retransmitted using an MCS and transmission power same as used in transmitting the data frame, wherein in response to the retransmission flag being a second value, it is indicated that the data frame is to be retransmitted using at least one of an MCS or transmission power different from as used in transmitting the data frame, wherein generating the acknowledgement message frame comprises at least one of:

in response to the data frame being of a trigger-based type not correctly received, or in response to the data frame being of a non-trigger-based type, with a physical header of the data frame being correctly received, and a load of the data frame not being correctly received, generating the acknowledgement message frame, the retransmission flag in the acknowledgement message frame being the second value; or in response to the data frame being of the non-trigger-based type and the physical header of the data frame not being correctly received, generating the acknowledgement message frame, the retransmission flag in the acknowledgement message frame being the first value.

14. The Wireless communication equipment of claim 13, wherein the second value indicates that the data frame is to be retransmitted using an MCS with a progressively lowered level.

15. The Wireless communication equipment of claim 13, wherein in response to the retransmission flag being the second value, it is indicated that the MCS used in retransmitting the data frame is lower in level than the MCS used in transmitting the data frame.

16. The Wireless communication equipment of claim 13, wherein in response to the acknowledgement flag identifying that the data frame is correctly received, the retransmission flag is null or of a default value.

* * * * *